United States Patent
Smith et al.

(10) Patent No.: US 8,453,676 B2
(45) Date of Patent: Jun. 4, 2013

(54) FUGITIVE EMISSION REDUCING VALVE ARRANGEMENT

(75) Inventors: Robert G. Smith, Perth (AU); Mathew William Davis, Devon (GB); Andrew Spencer Nicholson, Devon (GB)

(73) Assignee: Parker Hannifin Limited, Devon (GB)

( * ) Notice: Subject to any disclaimer, the term of this patent is extended or adjusted under 35 U.S.C. 154(b) by 501 days.

(21) Appl. No.: 12/687,215

(22) Filed: Jan. 14, 2010

(65) Prior Publication Data

US 2010/0155640 A1 Jun. 24, 2010

Related U.S. Application Data

(63) Continuation of application No. PCT/GB2008/002454, filed on Jul. 18, 2008.

(51) Int. Cl.
*F16K 31/50* (2006.01)

(52) U.S. Cl.
USPC ....... 137/613; 137/315.28; 251/214; 277/510

(58) Field of Classification Search
USPC ................ 137/315.01, 613, 315.28; 251/214, 251/315.01, 309, 315.1, 318, 170, 171; 277/520, 277/510, 518
See application file for complete search history.

(56) References Cited

U.S. PATENT DOCUMENTS

| | | | |
|---|---|---|---|
| 2,757,897 A | 8/1956 | Cline | |
| 4,687,180 A | 8/1987 | Simonelli et al. | |
| 4,687,181 A | 8/1987 | Simonelli et al. | |
| 5,188,335 A | 2/1993 | Pettinaroli | |
| 5,238,252 A * | 8/1993 | Stewen et al. | 277/511 |
| 5,271,427 A * | 12/1993 | Berchem | 137/375 |
| 8,100,383 B2 * | 1/2012 | Chou | 251/214 |
| 2005/0151107 A1 | 7/2005 | Shu | |

FOREIGN PATENT DOCUMENTS

| | | |
|---|---|---|
| DE | 81612500 U1 | 7/1986 |
| DE | 19952140 A1 | 5/1995 |
| DE | 4419426 A1 | 12/1995 |
| DE | 10058530 A1 | 5/2002 |
| FR | 2653522 | 4/1991 |
| GB | 2347196 A | 8/2000 |

OTHER PUBLICATIONS

International Search Report in corresponding International Patent Application No. PCT/GB2008/002454, dated Mar. 3, 2009.
Search Report under Section 17 in corresponding priority application No. GB0714225.0, dated Nov. 7, 2007.

* cited by examiner

*Primary Examiner* — Kevin Lee
(74) *Attorney, Agent, or Firm* — John A. Molnar, Jr.; Thomas G. Fistek

(57) ABSTRACT

A valve including a valve body having a bore and a spindle received in the bore, the spindle being actuatable to open and close the valve. A compression gland seal is provided about the spindle for compression between the spindle and the bore. A first seal ring is provided about the spindle at a position spaced along the spindle from the gland seal, and provides a seal between the spindle and the bore of the valve body. A second seal ring is provided about the spindle at a position spaced along the spindle from the gland seal and the first seal ring, and provides a further seal between the spindle and the bore of the valve body.

34 Claims, 4 Drawing Sheets

FUGITIVE EMISSION REDUCING VALVE ARRANGEMENT

CROSS REFERENCE TO RELATED APPLICATIONS

This application is a continuation of co-pending International Application No. PCT/GB2008/002454 filed Jul. 18, 2008, which application designated the United States, and which application claims priority to Great Britain Application No. 0714225.0, filed Jul. 20, 2007, the disclosure of each of which is incorporated herein by reference.

BACKGROUND OF THE INVENTION

The present invention relates to a valve arrangement. In particular, the invention relates to a valve arrangement suitable for fluid connectors or connection modules for use in connecting instrumentation equipment to a fluid container such as a process line or pressure vessel.

Within the instrumentation industry, it is necessary to take fluid from a fluid container such as a process pipeline or pressure vessel, so as to take measurements of quantities such as pressure, temperature, flow and fluid level measurements.

The instruments which are used to take such measurements are typically connected to a fluid container by a system of pipes, manifolds and valves. The connection system can include one or more tapping connections for tapping the fluid container.

The instruments which are used to take such measurements require maintenance, such as calibration. In order to carry this out it is necessary to modify the flow of the fluid between the fluid container and the instrument.

This flow modification is currently carried out by a number of methods all of which in some way require systems which are attached to the main process apparatus by means of threaded, flanged or welded connections. Traditionally the fluid passes through an isolation valve before being passed through tubing, pipe work or flanges to other valves commonly held within a manifold block. This manifold block may either be attached directly to the instrument or attached via a further system of tubing or pipe work.

There is a trend to legislate to regulate emissions of potentially harmful substances to the environment, for example the EU's IPPC directive 96/61/EC aimed at minimizing pollution from various industrial sources throughout the European Union. An important part of this legislation is reducing fugitive emissions, which will have significant consequences for all processes. According to the IPPS all plants and factories which fail to comply with the standards set by the directive may be closed from this point.

A typical European refinery looses between 600 and 10,000 tons of emissions per annum. Around 70% of these losses are estimated to be caused by plant equipment such as pipe flanges, pumps, valves and vessels. Leakage from valves is often the biggest source, reportedly accounting for around 50% of the fugitive emissions within the chemical and petrochemical industries.

Irrespective of the environmental impact, there is a tremendous financial burden on industry because fugitive emissions represent a huge loss of product, and cause of plant inefficiency. However, the true costs to industry are not always appreciated, as many of the costs associated with fugitive emissions are hidden, such as labor and materials to repair leaks, wasted energy, environmental fines and clean up costs, lost sales due to a poor green image, claims for personal injury and more. In this way, reducing fugitive emissions not only protects the environment, but can save companies time and money.

SUMMARY OF THE INVENTION

The present invention is directed to a valve arrangement including:

a valve body having a bore;

a spindle received in the bore in the valve body, the spindle actuatable to open and close the valve;

a gland seal provided about the spindle and compressed, such as by a compression member, between the spindle and the bore in the valve body;

a first ring seal, such as an O-ring, provided about the spindle at a position spaced along the spindle from the gland seal, for providing a seal between the spindle and the bore of the valve body; and a second ring seal, such as an O-ring, provided about the spindle at a position spaced along the spindle from the gland seal and the first seal, for providing a seal between the spindle and the bore of the valve body.

The arrangement of spaced ring seals used in combination with a rotary spindle and an active compression gland produces improved performance in reducing fugitive emissions.

One of the first and second seals may be provided in an annular groove in the surface of the spindle. Beneficially, the other of the seals is received in an open ended bore in the valve body, the seal preferably being retained in place by an end cap or sleeve (such as a bush) for the open end of the bore.

The seals may be positioned on different dimension diameters of the spindle; this aids in ameliorating the effect of damage with respect to performance of the valve arrangement.

Rotation of the spindle about its axis causes a valve element to reorientate between a valve open and a valve closed configuration. Beneficially, a valve arrangement is provided at an end of the spindle.

In one embodiment the valve arrangement is a ball valve and the rotation of the spindle about its axis reorientates the ball of the valve.

In an alternative embodiment, the valve may be a needle type valve, in which rotation of the spindle about its axis causes the spindle to move translationally in the axial direction to open and close the valve.

The gland seal may be a provided as, typically, an annular element formed of a plastic or elastomeric material, such as PTFE for example. Alternatively a graphite material may be used. The gland seal may be compressible via an adjustable compression arrangement to release or increase the compression force acting on the gland seal.

Beneficially the compression arrangement may include a gland adjuster to tighten or release the compression force acting on the gland seal. In certain embodiments, the gland adjuster may be rotatable about the axis of the spindle to tighten or release the compression force acting on the gland seal. In other embodiments, the gland adjuster may be threaded to a threaded shaft spaced from the spindle. Non-threaded gland arrangements are also envisaged.

In a first embodiment, particularly suited to a needle valve, the gland adjuster is beneficially threadably connected to the valve body. In an alternative embodiment, particularly suited to a ball valve, the gland adjuster is threadably connected to the spindle.

In one embodiment, particularly suited to a ball valve, the valve body and the spindle carry respective annular shoulders, spaced from one another in the axial direction, the gland seal being compressed between the respective shoulders.

In one embodiment, particularly suited to a needle valve, the valve includes an elongate spindle portion extending from the gland seal toward the valve element, the first and second seals are positioned on the elongate extending portion of the seal between the gland seal and the valve element.

In one embodiment, particularly suited to a ball valve, the valve includes a ball valve element and the seal arrangement includes a first seal positioned on the spindle at a position between the ball valve element and the gland seal, and a second seal positioned on the spindle at a position on the opposite side of the gland seal to the first seal.

In one embodiment, particularly suited to a ball valve, in order to assemble the valve:

a valve housing containing a valve element, is positioned in a housing block via a machined opening that is subsequently filled by a plug element;

the spindle is inserted through an end of the valve body and that end of the valve body is then secured to the housing block such that the end of the spindle engages operatively with the valve element in the valve housing.

The valve arrangement may be used in a connector (such as a flanged connector) including a housing having a fluid flow path extending via a plurality of valves.

The present invention, accordingly, comprises the construction, combination of elements, and/or arrangement of parts and steps which are exemplified in the detailed disclosure to follow.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

Figure 1:
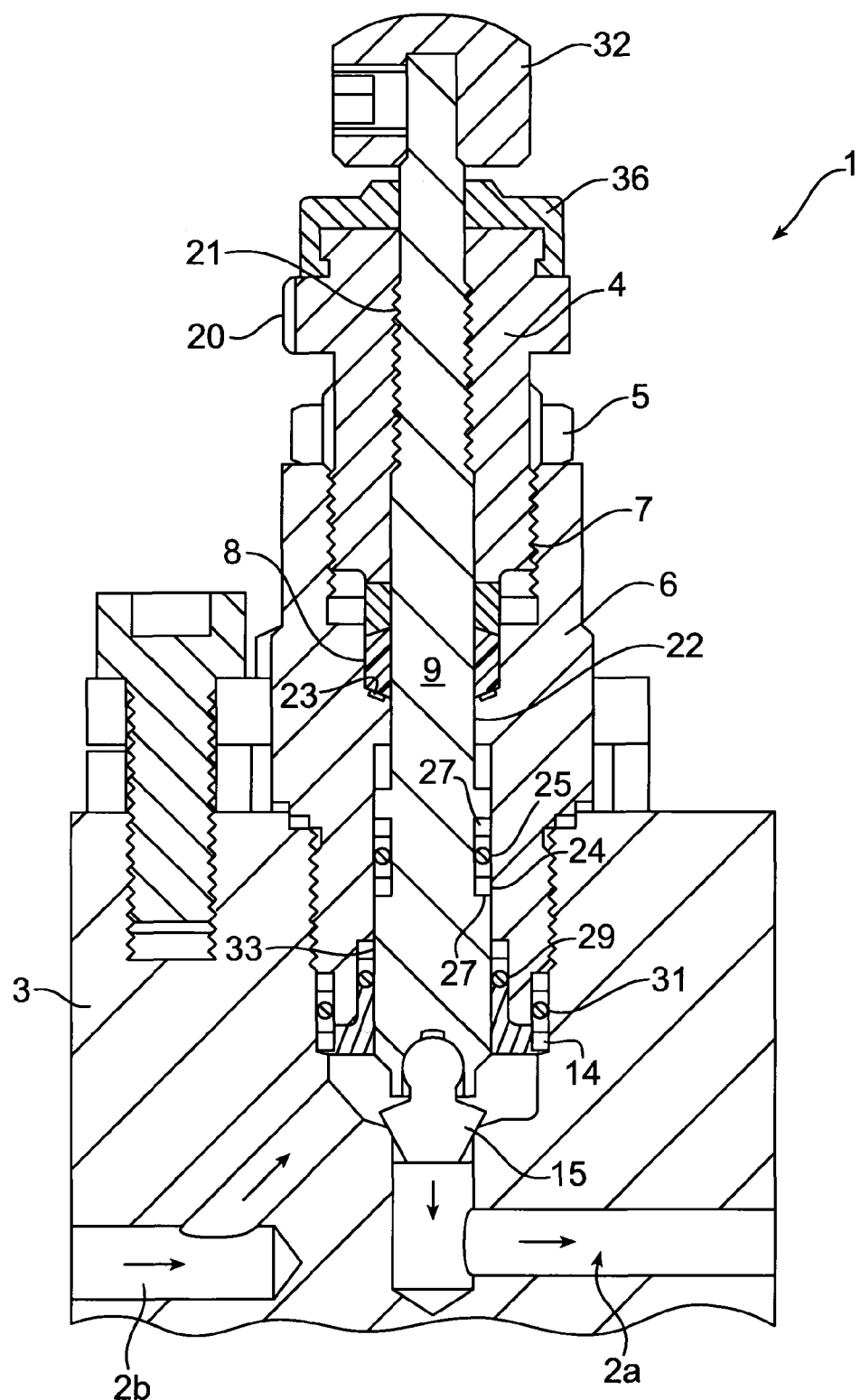
FIG. 1 is a schematic sectional view of a first embodiment of valve arrangement in accordance with the invention.

Referring to FIG. 1, there is shown a needle valve 1 for opening or closing a flowpath (having flowpath bores 2a, 2b) extending through a block 3 (such as a manifold block). Reference to needle valve should be construed broadly to cover any valve arrangement in which a valve element moves translationally with a spindle in order to open and close the valve. The needle valve includes a valve body 6 which is secured in a threaded bore in the block 3. Alternatively, or additionally, the valve body can be bolted to the block 3. The valve body 6 has an axial bore of differing diameters in order to accommodate various components of the valve.

A valve spindle 9 is positioned in the axial bore of the valve body 6, and is provided at its distal end with a manually (or machine) operable actuator 32 (such as a handle or T bar). At its proximal end the spindle carries a valve tip 15 which in use seals tight the flowpath between the bores 2a and 2b when the valve is in the closed position. The spindle also passes through an axial bore in a gland adjuster body 4. Gland adjuster body 4 is threadably mated with the valve body 6 in a relatively wide diameter threaded receiving bore at the distal end of the valve body 6. The gland adjuster body 4 has a head portion 20 spaced upwardly from the valve body 6 enabling rotation of the gland adjuster body 4 with respect to the valve body 6 in order to adjust the axial position with respect to one another. A protective plastics cap 36 is snap fitted over the head portion 20 and seals on the spindle 9 to prevent dust ingress. The gland adjuster body 4 has an axially threaded bore 21 which receives and is threadably mated with a threaded surface portion of the spindle 9. Rotation of the spindle (using the handle 32) causes the spindle 9 to move axially with respect to the gland adjuster body 4 and the valve body 6, by virtue of the threaded engagement of the spindle with the gland adjuster body 4.

Approximately mid-way between its ends, the valve body 6 is provided with a constriction diameter shoulder 22 which has an upward facing frustoconical (or annular) surface, 23, against which an annular sealing gland 8 abuts. The sealing gland 8 has an axial bore through which the spindle 9 passes. There is contact between the annular inner surface of the gland and the spindle 9. The gland 8 may be provided in two part form and is typically of PTFE or graphite. The lower surface of the gland 8 is shaped to complementarily abut the sealing surface of the shoulder 22. A generally annular thrust bush 7 is provided between the proximal end of the gland adjuster body 4 and the gland 8. The gland adjuster body 4 can be caused to move into increasing threaded engagement with the valve body 6 by rotation of the gland adjuster body 4 about the valve axis in the appropriate rotational direction. In so doing the thrust bush 7 is urged by the gland adjuster body 4 into compression engagement with the gland 8 which compresses as a result to energize the seal with the surface of the shoulder 22 and the spindle 9 at this location. A locking ring 5 is threadably mated to a threaded external surface of the gland adjuster body 4. The locking ring may be tightened against the distal end of the valve body 6 to ensure fixing of the relative positions of the gland adjuster body 4 and the valve body 6 when the gland is compressed/energized to the required degree.

The lower portion of the valve body 6 (i.e., flow-wise upstream, or process side, of the gland 8 seal with the valve body 6 seal at shoulder 22) is provided with an enlarged diameter bore which has a step from a first diameter bore portion to an enlarged diameter portion. The spindle in the narrower portion of the valve body 6 bore is provided with an annular groove, 24, within which is received an electrometric O-ring seal 25, which is secured on the spindle 9. Anti-extrusion rings 27 are provided at either side of the O-ring seal. In the enlarged diameter bore of the lower portion of the valve body 6 (at the distal end of the valve body 6) the spindle has an electrometric O-ring seal 29 provided on its maximum diameter. The O-ring seal 29 is held in place on the spindle 9 by an end cap 14 of the valve body 6 and a further anti-extrusion ring 33. The seal between the inner bore of the valve body 6 is therefore at two places in addition to at the gland 8. Also the seal is on different diameters of the bore of the valve body 6. This reduce significantly the risk of the seal existing on a scratched or damaged portion of the valve body 6 bore (for example arising from damage during manufacture, shipping, or assembly).

The external diameter of the lower portion of the valve body 6 is provided with a threaded surface for mounting in the threaded bore of the block 3. An O-ring seal 31 is provided on the exterior of the external diameter of the lower portion of the valve body 6. In tests the use of the arrangement having the two O-ring seals, spaced from one another on the spindle and the compression gland sealing at a shoulder on the spindle has been shown to improve efficiency in respect of fugitive emission tests.

Figure 2:
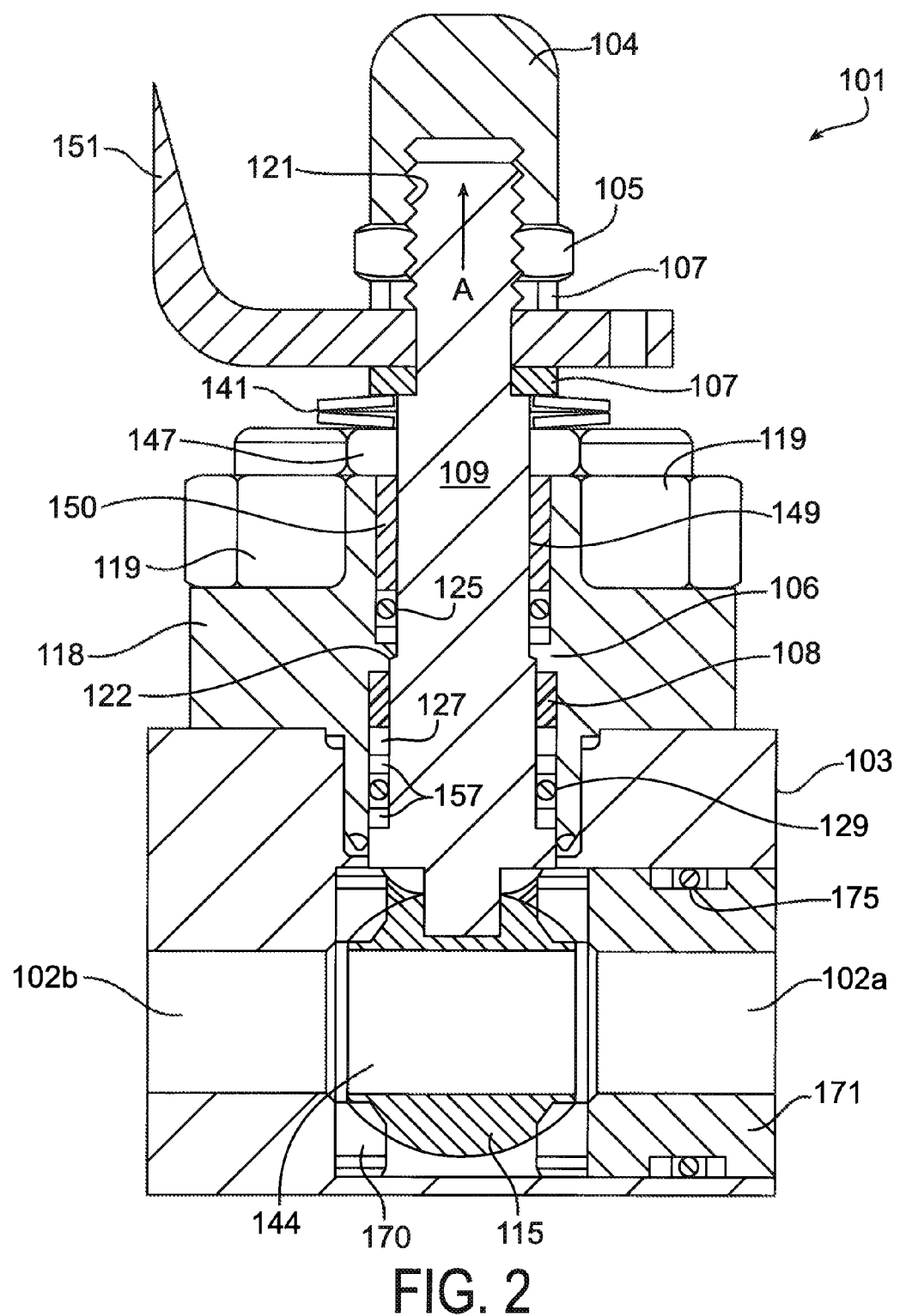
FIG. 2 is a schematic sectional view of a second embodiment of valve arrangement in accordance with the invention.

In the embodiment of FIG. 2 there is shown a ball valve 101 for opening or closing a flowpath (having flowpath bores 102a, 102b) extending through a block 103 (such as a manifold block). Reference to ball valve should be construed broadly to cover any arrangement in which a valve element moves rotationally with a valve spindle to open and close the valve. The ball valve 101 includes a valve body 106 which has a flange 118 and secured via bolts 119 into a threaded bore in the block 103. The valve body has an axial bore of differing diameters in order to accommodate, secure and retain various components of the valve.

A valve spindle 109 is positioned in the axial bore of the valve body 106, and is provided towards its distal end with a manually (or machine) operable actuator 151 (such as a handle). At its proximal end the spindle carries a ball 115 which has a bore 144 which in use aligns with the flowpath between the bores 102a and 102b when the valve is in the open position, turning the handle 151 to cause the spindle 109 to rotate about its axis through 90 degrees causes the ball 115 and bore 144 to correspondingly rotate through 90 degrees top the valve closed position. The spindle also passes through and mates with a threaded axial bore in a gland adjuster cap 104 which is threadably mounted to the threaded distal end of the shaft above the handle 151. The gland adjuster cap 104 has a head portion spaced upwardly from the spindle 109 enabling rotation of the gland adjuster cap 104 with respect to the spindle 109 in order to adjust the axial position with respect to one another. The gland adjuster cap 104 has an axially threaded bore 21 which receives and is threadably mated with the threaded end of the spindle 109.

The valve body 106 has, approximately mid way along its bore, an inwardly projecting annular constriction shoulder 122. The spindle has a correspondingly outwardly projecting annular formation 127 (a shoulder or step) which is slightly spaced in the axial direction from the constriction shoulder 122 of the valve body 106. In the space between the shoulders 122 and 127 a sealing gland 108 is positioned. The sealing gland 108 is similar in construction and operation to that in the previously described embodiment. The sealing gland 108 has an axial bore through which the spindle 109 passes. There is contact between the annular inner surface of the gland and the spindle 109. The gland 108 may be provided in two part form and is typically of PTFE or graphite.

A generally annular thrust bush 107 is provided between the proximal end of the gland adjuster cap 104 and a spring annulus 141. Below the spring annulus is a further thrust bush 147 which transmits force in the axial direction to the distal end of the valve body 106 with which the thrust bush 147 is in contact. The gland adjuster cap 104 can be caused to move into increasing threaded engagement with the spindle 109 by rotation of the gland adjuster cap 104 about the spindle axis in the appropriate rotational direction. In so doing the spindle is pulled in the direction of arrow A which compresses the gland 8 between the shoulders 127 and 122 as a result energizing the seal with the surface of the shoulders and the spindle 109. A locking ring 105 is threadably mated to a threaded external surface of the valve spindle 109. The locking ring may be tightened against the distal end of the gland adjuster cap 104 to ensure fixing of the relative positions of the gland adjuster cap 104 and the spindle 109 when the gland is compressed/energized to the required degree.

The upper portion of the valve above the shoulder 122 is provided with an electrometric O-ring seal 125, which is secured on the spindle 109. An anti-extrusion ring is provided between the O-ring 125 and the shoulder 122. Above the O-ring 125 is a PEEK bush 150 extending axially to the end of the valve body 106. The purpose of the PEEK bush 150 is to prevent the spindle axis from tilting out of alignment with the axis of the bore in the valve body 6.

At a position below the annular formation 127, the spindle 109 has a groove in its external surface within which is received an electrometric O-ring seal 129 which is secured on the spindle 109. Anti-extrusion rings 157 are provided at either side of the O-ring seal in order to ensure that the O-ring seal is maintained in position. The seal with the inner bore of the valve body is therefore at two places in addition to at the gland 108. The external diameter of the lower portion of the valve body 106 is provided with a threaded surface for mounting in the threaded bore of the block 103.

In order to assemble the valve, the ball valve housing 170 is positioned in the block 103 via a machined opening that is subsequently filled by the plug element 171 which is provided with the flowpath bore 102a. An annular seal 175 is provided to seal the plug element 171 in the block 103. The spindle is next inserted up through the lower end of the valve body 106 and the flange 118 of the valve body 106 can then be secured to the block 103. The spring 141, handle 151, and gland adjuster cap 104 can then be mounted about the spindle.

In tests the use of the arrangement having the two O-ring seals, spaced from one another on the spindle and the compression gland sealing at a shoulder on the spindle has been shown to improve efficiency in respect of fugitive emission tests.

Figure 3:
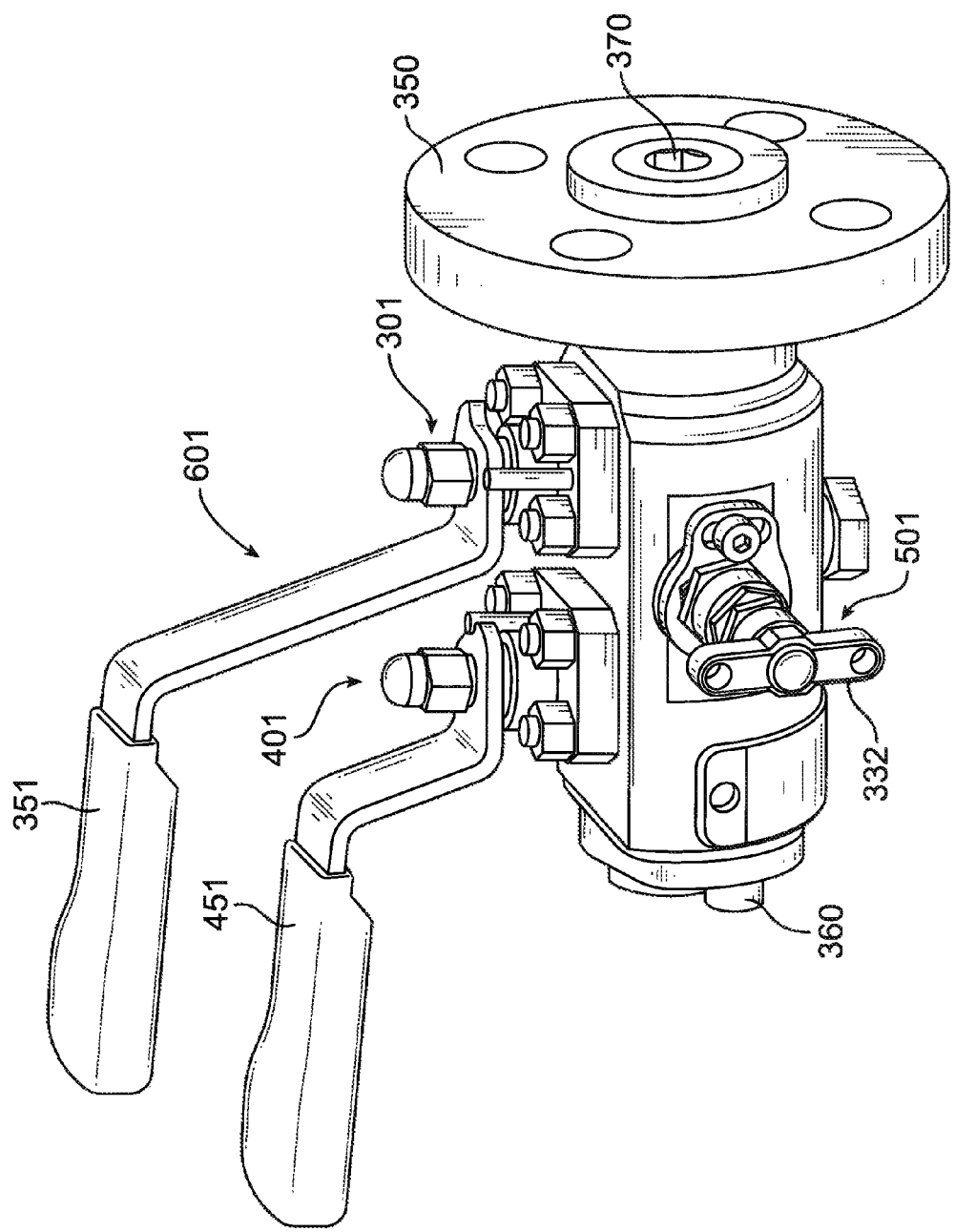
FIG. 3 is a perspective view of a connector arrangement incorporating valves of the embodiments of FIGS. 1 and 2.
Figure 4:
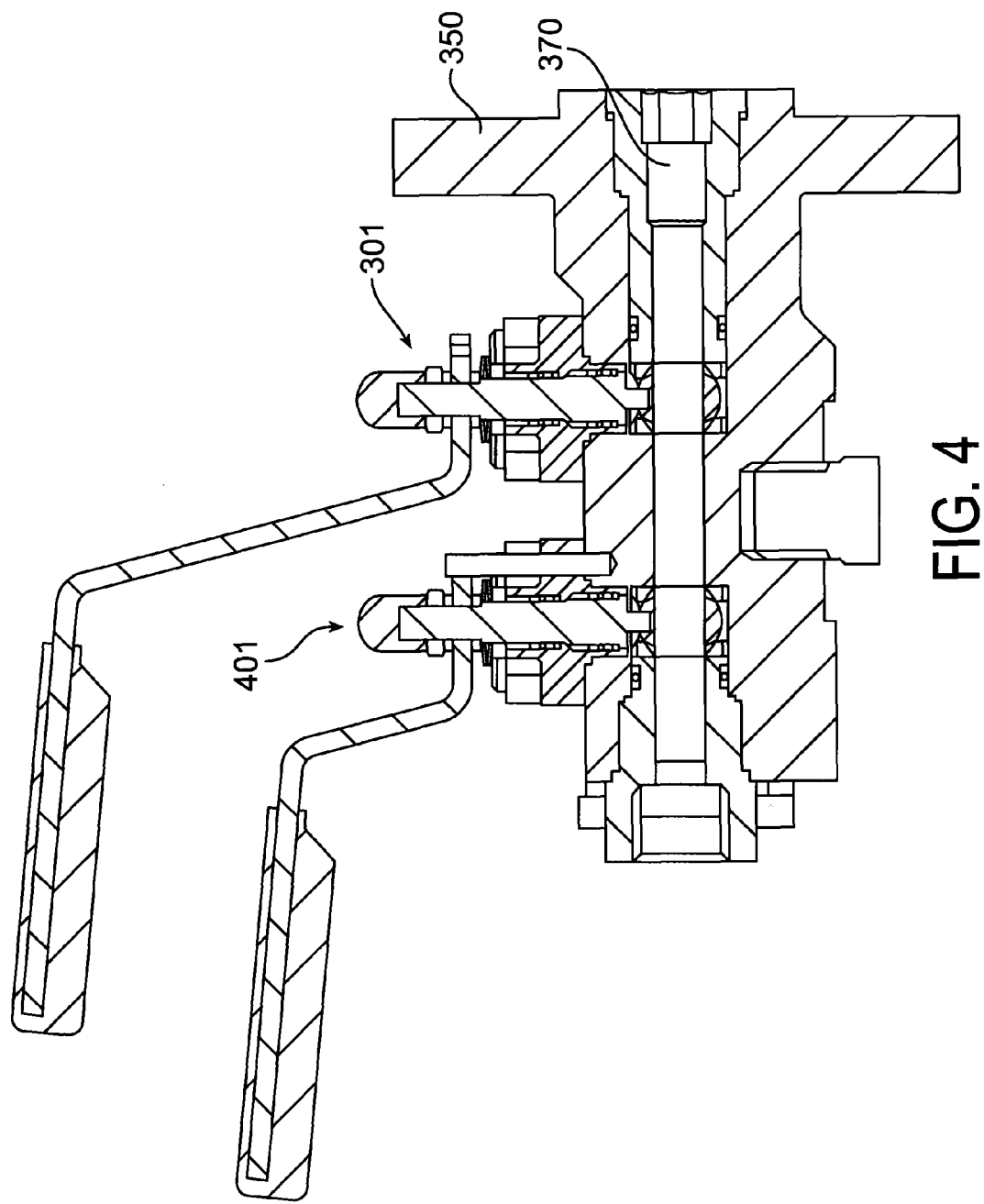
FIG. 4 is a sectional view of the arrangement of FIG. 3.

Referring to FIG. 3, there is shown a flanged connector element 601 having a fluid connection flowpath extending via a pair of ball valves 301, 401 and a needle valve 501. The flanged connector can be connected to a fluid container and fluid taken off via the entry port 370 and passed via the valves 301 and 304 to process instrumentation mounted at mounting fitment 360. When it is wished to isolate the instrumentation, the valves can be closed in a defined sequence. This type of use and operation is well known in the art.

The invention provides for a valve arrangement of a specific type in which a specific combination of spaced O-ring seals are used in conjunction with a rotary spindle and a an active compression gland to produce an improved performance.

As it is anticipated that certain changes may be made in the present invention without departing from the precepts herein involved, it is intended that all matter contained in the foregoing description shall be interpreted in as illustrative rather than in a limiting sense. All references including any priority documents cited herein are expressly incorporated by reference.

What is claimed is:

1. A valve comprising:
a valve body having a bore;
a spindle received coaxially in the bore, the spindle being actuatable to open and close the valve;
an annular gland seal positioned coaxially about the spindle between the spindle and the bore;
a compression member disposed coaxially over the spindle, the compression member being actuable to effect the compression of the gland seal between the valve body and the spindle for providing a first seal therebetween;
a first seal ring positioned coaxially about the spindle at a first position spaced along the spindle from the gland seal, the first seal ring being compressed between the valve body and the spindle for providing a second seal therebetween; and a second seal ring positioned coaxially about the spindle at a second position spaced along the spindle from the gland seal and the first seal ring, the second seal ring being compressed between the valve body and the spindle for providing a third seal therebetween.

2. The valve of claim 1 wherein:
the bore has an inner surface;
the spindle has an outer surface positioned opposite the inner surface of the bore, the spindle outer surface having a generally annular groove formed therein; and
one of the first and the second seal ring is mounted in the groove.

3. The valve of claim 1 wherein the bore extends intermediate an open first end and an open second end, one of the first and the second seal ring being received in one of the first and the second end of the bore, the valve further comprising a retainer received within said one of the first and the second end of the bore, said one of the first and the second seal ring being retained in the bore by the retainer.

4. The valve of claim 1 wherein:
the spindle is formed as having a first diameter and a second diameter different from the first diameter; and
the first seal ring is positioned about the spindle first diameter; and
the second seal ring is positioned about the spindle second diameter.

5. The valve of claim 1 wherein the spindle is rotatable to open and close the valve.

6. The valve of claim 5 wherein the spindle extends between a first end and a second end, the valve further comprising a valve element provided at one of the first and the second end of the spindle, the valve element being moveable by the rotation of the spindle to open and close the valve.

7. The valve of claim 6 wherein the valve element is configured as a ball, and the rotation of the spindle rotates the ball to open and close the valve.

8. The valve of claim 7 wherein the first seal ring is positioned on the spindle adjacent a first side of the gland seal, and the second seal ring is positioned on the spindle adjacent a second side of the gland seal opposite the first side.

9. The valve of claim 6 wherein the rotation of the spindle moves the valve element translationally to open and close the valve.

10. The valve of claim 9 wherein the first and the second seal ring each is positioned on the spindle between the gland seal and the valve element.

11. The valve of claim 1 wherein the gland seal is formed of a plastic or elastomeric material.

12. The valve of claim 1 wherein the compression member is adjustable to release or increase the compression of the gland seal.

13. The valve of claim 12 wherein the compression member is adjustable by being rotatable about the spindle.

14. The valve of claim 13 wherein the compression member is threadably connected to the valve body.

15. The valve of claim 13 wherein the compression member is threadably connected to the spindle.

16. The valve of claim 1 wherein the valve body is formed as having a generally annular first shoulder disposed adjacent a first side of the gland seal, and the spindle is formed as having generally annular second shoulder disposed adjacent a second side of the gland seal opposite the first side, the gland seal being compressed between the first and the second shoulder.

17. A fluid connection element comprising:
a housing block having a fluid flow path therethrough; and
one or more valves positioned in the housing block for opening and closing the fluid flow path, each of said valves comprising:
a valve body having a valve body bore;
a spindle received coaxially in the valve body bore, the spindle being actuatable to open and close the valve;
an annular gland seal positioned coaxially about the spindle between the spindle and the valve body bore;
a compression member disposed coaxially over the spindle, the compression member being actuable to effect the compression of the gland seal between the valve body and the spindle for providing a first seal therebetween;
a first seal ring positioned coaxially about the spindle at a first position spaced along the spindle from the gland seal, the first seal ring being compressed between the valve body and the spindle for providing a second seal therebetween; and
a second seal ring positioned coaxially about the spindle at a second position spaced along the spindle from the gland seal and the first seal ring, the second seal ring being compressed between the valve body and the spindle for providing a third seal therebetween.

18. The fluid connection element of claim 17 wherein:
the valve body bore has an inner surface;
the spindle has an outer surface positioned opposite the inner surface of the valve body bore, the spindle outer surface having a generally annular groove formed therein; and
one of the first and the second seal ring is mounted in the groove.

19. The fluid connection element of claim 17 wherein the valve body bore extends intermediate an open first end and an open second end, one of the first and the second seal ring being received in one of the first and the second end of the valve body bore, the valve further comprising a retainer received within said one of the first and the second end of the valve body bore, said one of the first and the second seal ring being retained in the valve body bore by the retainer.

20. The fluid connection element of claim 17 wherein:
the spindle is formed as having a first diameter and a second diameter different from the first diameter; and
the first seal ring is positioned about the spindle first diameter; and
the second seal ring is positioned about the spindle second diameter.

21. The fluid connection element of claim 17 wherein the spindle is rotatable to open and close the valve.

22. The fluid connection element of claim 21 wherein the spindle extends between a first end and a second end, the valve further comprising a valve element provided at one of the first and the second end of the spindle, the valve element being moveable by the rotation of the spindle to open and close the valve.

23. The fluid connection element of claim 21 wherein the valve element is configured as a ball, and the rotation of the spindle rotates the ball to open and close the valve.

24. The fluid connection element of claim 23 wherein the first seal ring is positioned on the spindle adjacent a first side of the gland seal, and the second seal ring is positioned on the spindle adjacent a second side of the gland seal opposite the first side.

25. The fluid connection element of claim 22 wherein the rotation of the spindle moves the valve element translationally to open and close the valve.

26. The fluid connection element of claim 25 wherein the first and the second seal ring each is positioned on the spindle between the gland seal and the valve element.

27. The fluid connection element of claim 17 wherein the gland seal is formed of a plastic or elastomeric material.

28. The fluid connection element of claim 17 wherein the compression member is adjustable to release or increase the compression of the gland seal.

29. The fluid connection element of claim 28 wherein the compression member is adjustable by being rotatable about the spindle.

30. The fluid connection element of claim 29 wherein the compression member is threadably connected to the valve body.

31. The fluid connection element of claim 29 wherein the compression member is threadably connected to the spindle.

32. The fluid connection element of claim 17 wherein the valve body is formed as having a generally annular first shoulder disposed adjacent a first side of the gland seal, and the spindle is formed as having generally annular second shoulder disposed adjacent a second side of the gland seal opposite the first side, the gland seal being compressed between the first and the second shoulder.

33. The fluid connection element of claim 17 wherein the housing block has a first end having a first opening therethrough, a first one of said valves being positioned in the first opening, and the fluid connection element further comprising a first plug received within the first opening, the first plug closing the first opening and having a first plug bore therethrough forming a portion of the fluid flow path through the housing block.

34. The fluid connection element of claim 33 wherein the housing block has a second end opposite the first end having a second opening therethrough, a second one of said valves being positioned in the second opening, and the fluid connection element further comprising a second plug received within the second opening, the second plug closing the second opening and having a second plug bore therethrough forming a portion of the fluid flow path through the housing block.

* * * * *